(12) United States Patent
Lee et al.

(10) Patent No.: US 10,109,833 B2
(45) Date of Patent: Oct. 23, 2018

(54) SEPARATOR FOR RECHARGEABLE BATTERY AND RECHARGEABLE BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Byungmin Lee, Suwon-si (KR); Hana Kim, Suwon-si (KR); Myungkook Park, Suwon-si (KR); Jungsue Jang, Suwon-si (KR); Sung Soo Han, Hwaseong-si (KR); Jun Hyuk Moon, Daejeon (KR); Seungrim Yang, Seongnam-si (KR); Minho Cho, Suwon-si (KR); Hyoungwoo Choi, Hwaseong-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/338,505

(22) Filed: Oct. 31, 2016

(65) Prior Publication Data
US 2017/0133653 A1 May 11, 2017

(30) Foreign Application Priority Data
Nov. 6, 2015 (KR) .......... 10-2015-0155980

(51) Int. Cl.
*H01M 2/00* (2006.01)
*H01M 2/16* (2006.01)
*H01M 10/0525* (2010.01)

(52) U.S. Cl.
CPC ......... *H01M 2/1686* (2013.01); *H01M 2/166* (2013.01); *H01M 2/1646* (2013.01); *H01M 2/1653* (2013.01); *H01M 10/0525* (2013.01)

(58) Field of Classification Search
CPC .. H01M 2/1646; H01M 2/1653; H01M 2/166; H01M 2/1686; H01M 10/0525
See application file for complete search history.

(56) References Cited

U.S. PATENT DOCUMENTS

2014/0193692 A1* 7/2014 Yamada .................. B32B 27/32
429/144
2014/0272532 A1* 9/2014 Park ...................... H01M 2/166
429/144

FOREIGN PATENT DOCUMENTS

| JP | 2008-066094 A | 3/2008 |
|---|---|---|
| JP | 2008-210791 A | 9/2008 |
| JP | 5183435 B2 | 4/2013 |
| JP | 5234817 B2 | 7/2013 |
| JP | 5308118 B2 | 10/2013 |
| JP | 2015-053282 A | 3/2015 |
| JP | 2015-115321 A | 6/2015 |

(Continued)

*Primary Examiner* — Cynthia H Kelly
*Assistant Examiner* — Monique M Wills
(74) *Attorney, Agent, or Firm* — Lee & Morse, P.C.

(57) ABSTRACT

A separator for a rechargeable battery includes a porous substrate and a heat-resistance layer on at least one surface of the porous substrate. The heat-resistance layer includes a binder having a cross-linked structure, a sphere-shaped filler, and a plate-shaped filler, and the plate-shaped filler is included in a smaller amount than the sphere-shaped filler in the heat-resistance layer. A rechargeable battery includes the separator.

14 Claims, 2 Drawing Sheets

(56) References Cited

FOREIGN PATENT DOCUMENTS

KR     10-1334888 B1    11/2013
KR     10-1515357 B1    4/2015

\* cited by examiner

[FIG. 1]
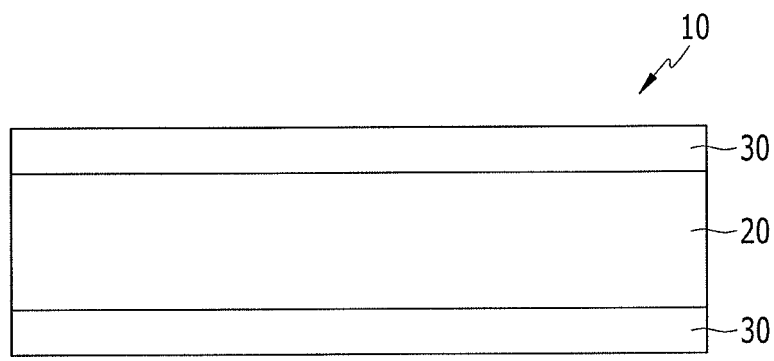
[FIG. 2]
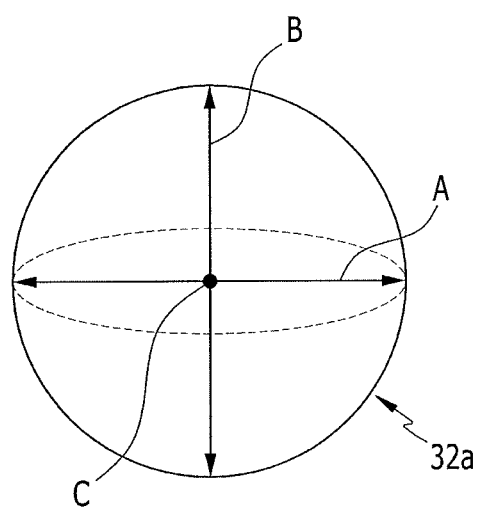

[FIG. 3]
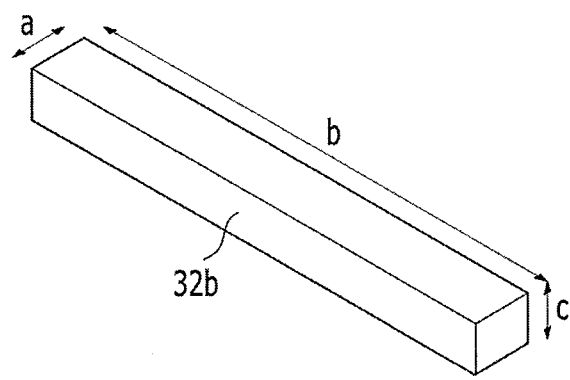
[FIG. 4]
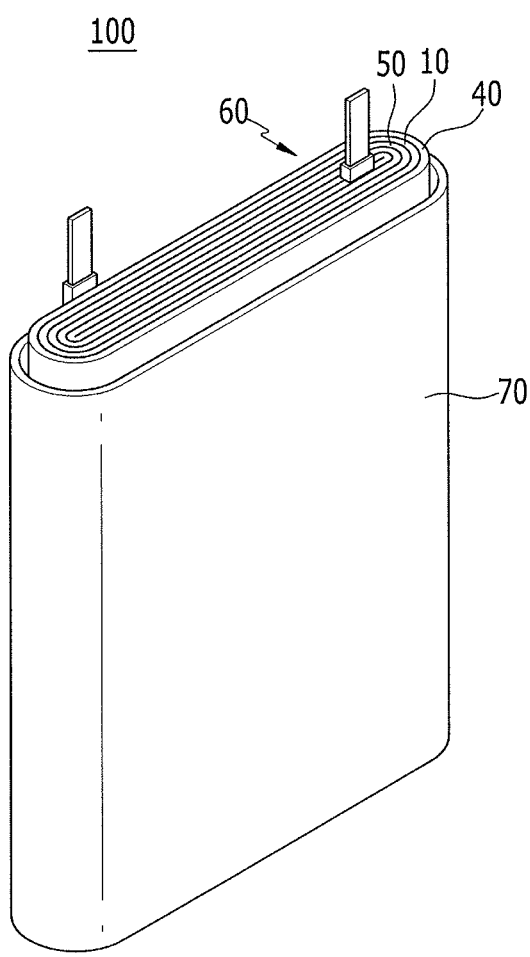

SEPARATOR FOR RECHARGEABLE BATTERY AND RECHARGEABLE BATTERY INCLUDING THE SAME

CROSS-REFERENCE TO RELATED APPLICATION

Korean Patent Application No. 10-2015-0155980, filed on Nov. 6, 2015, in the Korean Intellectual Property Office, and entitled: "Separator for Rechargeable Battery and Rechargeable Battery Including the Same," is incorporated by reference herein in its entirety.

BACKGROUND

1. Field

Embodiments relate to a separator for a rechargeable battery and a rechargeable lithium battery including the same.

2. Description of the Related Art

A separator for an electrochemical battery is an intermediate film that separates a positive electrode and a negative electrode in a battery. The separator maintains ion conductivity continuously to enable charge and discharge of a battery.

SUMMARY

Embodiments are directed to a separator for a rechargeable battery including a porous substrate and a heat-resistant layer on at least one surface of the porous substrate. The heat-resistant layer includes a binder having a cross-linked structure, a sphere-shaped filler, and a plate-shaped filler. The plate-shaped filler is included in a smaller amount than the sphere-shaped filler in the heat-resistant layer.

The plate-shaped filler may have an aspect ratio of about 2 to about 10.

The plate-shaped filler may have an aspect ratio of about 2 to about 5.

The plate-shaped filler may include a plate-shaped mineral.

The plate-shaped filler may include a plate shaped oxide, a plate-shaped nitride, or a combination thereof.

The plate-shaped filler may include talc, mica, clay, or a combination thereof.

The sphere-shaped filler may include alumina.

The plate-shaped filler may be included in an amount of greater than or equal to about 10 wt % and less than about 50 wt % based on a total weight of the sphere-shaped filler and the plate-shaped filler.

The binder having a cross-linked structure may be obtained by curing a monomer, an oligomer, or a polymer having at least 2 curable functional groups.

The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof.

An elastic modulus of the heat-resistant layer is greater than or equal to about 3,900 MPa.

An elastic modulus of the separator is greater than or equal to about 2,000 MPa.

The porous substrate may include a polyolefin.

The porous substrate may include a single layer or two or more layers.

Embodiments are also directed to a rechargeable lithium battery including a positive electrode, a negative electrode, and the separator as described above between the positive electrode and the negative electrode.

BRIEF DESCRIPTION OF THE DRAWINGS

Features will become apparent to those of skill in the art by describing in detail exemplary embodiments with reference to the attached drawings in which:

FIG. 1 illustrates a cross-sectional view of a separator for a rechargeable battery according to an embodiment, FIG. 2 illustrates a schematic view depicting an aspect ratio of a sphere-shaped filter according to an embodiment, FIG. 3 illustrates a schematic view depicting an aspect ratio and a ratio of an area and a thickness of a plate-shaped filler, and FIG. 4 illustrates an exploded partial perspective view of a rechargeable lithium battery according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a cross-sectional view of a separator for a rechargeable battery according to an embodiment.

Referring to FIG. 1, a separator 10 for a rechargeable battery according to an embodiment may include a porous substrate 20 and a heat-resistant layer 30 disposed on one surface or both surfaces of the porous substrate 20.

The porous substrate 20 may have a plurality of pores. The porous substrate 20 may be a general porous substrate used in an electrochemical device. Examples of the porous substrate 20 include a polymer film formed of a polymer or a mixture of two or more of a polyolefin such as polyethylene, and polypropylene, a polyester such as polyethyleneterephthalate and polybutyleneterephthalate, a polyacetal, a polyamide, a polyimide, a polycarbonate, a polyetheretherketone, a polyaryletherketone, a polyetherimide, a polyamideimide, a polybenzimidazole, a polyethersulfone, a polyphenyleneoxide, a cyclic olefin copolymer, polyphenylenesulfide, polyethylenenaphthalate, a glass fiber, TEFLON (tetrafluoroethylene), and a polytetrafluoroethylene (PTFE). For example, the porous substrate 20 may be a polyolefin-based substrate. The polyolefin-based substrate may provide improved safety of a battery due to an improved shut-down function. The polyolefin-based substrate may be selected from, for example, a polyethylene single film, a polypropylene single film, a polyethylene/polypropylene double film, a polypropylene/polyethylene/polypropylene triple film, and a polyethylene/polypropylene/polyethylene triple film. The polyolefin-based resin may include a non-olefin resin in addition to an olefin resin or a copolymer of olefin and a non-olefin monomer.

The porous substrate 20 may have a thickness of about 1 μm to about 40 μm, or, for example, about 1 μm to about 30 μm, about 1 μm to about 20 μm, about 5 μm to about 15 μm, or about 5 μm to about 10 μm.

The heat-resistant layer 30 may include a binder and a filler.

The binder may include one kind of binder or two or more kinds of binders.

The binder may include a cross-linked binder having a cross-linked structure.

The cross-linked binder may be obtained from monomer, oligomer and/or polymer reactive to heat and/or light, for example, may be obtained from a multi-functional monomer, a multi-functional oligomer, and/or a multi-functional polymer having at least two curable functional groups. For example, a cross-linked binder may include about 2 to about 30 curable functional groups, or, for example, about 2 to about 20 curable functional groups, or, for example, about 3 to about 15 curable functional groups.

The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, as examples.

The cross-linked binder may further improve heat resistance when the cross-linking degree is high.

For example, the cross-linked binder may be obtained from a monomer, an oligomer and/or a polymer including at least two vinyl groups, (meth)acrylate groups, epoxy groups, oxetane groups, ether groups, cyanate groups, isocyanate groups, hydroxy groups, carboxyl groups, thiol groups, amino groups, alkoxy groups, or a combination thereof.

For example, the cross-linked binder may be obtained by curing a monomer, an oligomer and/or a polymer having at least two (meth)acrylate groups. For example, the cross-linked binder may be obtained by curing, for example, ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

For example, the cross-linked binder may be obtained by curing a monomer, an oligomer and/or a polymer having at least two epoxy groups. For example, the cross-linked binder may be obtained by curing bisphenol A diglycidyl ether, bisphenol F diglycidyl ether, hexahydrophthalic glycidyl ester, or a combination thereof.

For example, the cross-linked binder may be obtained by curing a monomer, an oligomer and/or a polymer having at least two isocyanate groups. The cross-linked binder may be obtained by curing, for example, diphenylmethane diisocyanate, 1,6-hexamethylene diisocyanate, 2,2,4 2,2, and 4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The cross-linked binder may have a weight average molecular weight of about 50 g/mol to about 80,000 g/mol, or, for example, about 100 g/mol to about 60,000 g/mol. A cross-linked binder having a weight average molecular weight within the range may provide a heat resistance.

The binder may further include a non-cross-linkable binder.

The non-cross-linkable binder may be, for example a polyvinylidenefluoride (PVdF) homopolymer, a polyvinylidenefluoride-hexafluoropropylene (PVdF-HFP) copolymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethylcellulose, an acrylonitrile-styrene-butadiene copolymer, or a combination thereof.

The binder may be included in an amount of about 1 wt % to about 80 wt %, or, for example about 3 wt % to about 70 wt % or about 5 wt % to about 50 wt % based on the total amount of the heat-resistant layer 30.

The filler may be an inorganic filler, an organic filler, an organic/inorganic filler, or a combination thereof.

The filler may have two or more kinds of different shapes. For example, the filler may include a sphere-shaped filler 32a and a plate-shaped filler 32b.

The sphere-shaped filler 32a may be a particle having a substantially spherical shape. The sphere-shaped filler 32a may include a dented spherical particle or oval particle besides the completely spherical particle. FIG. 2 illustrates a schematic view depicting an aspect ratio of a sphere-shaped filler according to one embodiment. The aspect ratio in the sphere may be represented by a ratio of the longest axis and the shortest axis among axes passing the center (c). Referring to FIG. 2, the aspect ratio of sphere-shaped filler 32a may be represented by A/B. The sphere-shaped filler 32a may have an aspect ratio of, for example, substantially 1. In some implementations, the aspect ratio may range from about 1.0 to about 1.2.

The sphere-shaped filler 32a may be a particle having a diameter of about 1 nm to about 2,000 nm, or, for example, a particle having a diameter of about 100 nm to about 1000 nm, or, for example, a particle having a diameter of about 100 nm to 500 nm. The sphere-shaped filler 32a may be or include, for example, alumina.

The plate-shaped filler 32b is a 2-dimensional or 3-dimensional particle having a predetermined length and a predetermined width. FIG. 3 illustrates a schematic view describing an aspect ratio of a plate-shaped filler and a ratio of an area and a thickness. Referring to FIG. 3, when the plate-shaped filler 32b has a first direction length (a), a second direction length (b), and a third direction length (c), the shortest length (c) among the first direction length (a), the second direction length (b), and the third direction length (c) is defined as a thickness, and the longer one in two other lengths may be defined as a long axis direction length, and the shorter one of the two other lengths may be defined as a short axis direction length. The aspect ratio may be represented by a ratio of a long axis direction length/a short axis direction length. For example, in FIG. 3, the aspect ratio may be calculated by b/a. The ratio of an area to a thickness may be represented by a ratio of an area and a thickness of the surface made up of a long axis direction length and a short axis direction length. For example, in FIG. 3, the ratio of area to thickness may be calculated by (a×b)/c.

The plate-shaped filler 32b may have an aspect ratio of, for example, about 2 to about 50, or, for example, an aspect ratio of about 2 to about 10, or, for example, an aspect ratio of about 2 to about 5. The plate-shaped filler 32b may have a ratio of an area and a thickness of, for example, about 10 to about 300, or, for example, about 50 to about 200, or, for example, about 70 to about 180, or, for example, about 66.7 to about 166.7.

The plate-shaped filler 32b may be a particle having a long diameter of about 1 nm to about 2,000 nm, or, for example, about 100 nm to about 1,000 nm, or, for example, about 100 nm to about 500 nm.

The plate-shaped filler 32b may be, for example, a plate-shaped inorganic particle, or may be, for example, a plate-shaped oxide, a plate-shaped nitride, a plate-shaped mineral, or a combination thereof. For example, the plate-shaped filler 32b may be or include talc, mica, clay, or a combination thereof.

The plate-shaped filler 32b may be included in the smaller amount than the sphere-shaped filler 32a. The plate-shaped filler 32b may be included in, for example, less than about 50 wt % based on the total weight of the sphere-shaped filler 32a and the plate-shaped filler 32b. For example, the plate-shaped filler 32b may be included in greater than or equal to about 10 wt % and less than about 50 wt % based on the total weight of the sphere-shaped filler 32a and the plate-shaped filler 32b.

In the heat-resistant layer 30 as described above, by providing a sphere-shaped filler 32a and a plate-shaped filler 32b having different shapes together, wherein the plate-shaped filler 32b is less included than the sphere-shaped filler 32a, contact regions of the sphere-shaped filler 32a with the plate-shaped filler 32b may be increased, thus, the contact strength of coating layer 30 may be enhanced. The elastic modulus of the separator 10 including the heat-resistant layer 30 and the heat-resistant layer 30 may be enhanced, and thereby the high temperature heat resistance may be improved. The heat resistance may include not only the high temperature heat resistance of the separator 10 by itself, but also the high temperature heat resistance when the separator 10 is employed in a rechargeable battery and impregnated with an electrolyte solution.

For example, the elastic modulus of heat-resistant layer 30 may be greater than or equal to about 3,900 MPa, or, for example, about 4,000 MPa to about 5,000 MPa. For example, the elastic modulus of separator 10 including the heat-resistant layer 30 may be greater than or equal to about 2,000 MPa, or, for example, or, about 2,050 MPa to about 4,000 MPa, or, for example, about 2,100 MPa to about 3,500 MPa.

The filler may be included in an amount of about 20 wt % to about 99 wt % based on the total weight of the heat-resistant layer 30, or, for example, about 30 wt % to about 97 wt %, or, for example, or, about 50 wt % to about 95 wt %. By including the filler within the range, abruptly shrinking or deforming of the separator due to increasing temperatures may be further prevented or reduced, thereby further improving the heat resistance of the separator 10.

The heat-resistant layer 30 may have a thickness of about 0.01 μm to about 20 μm, or, for example about 1 μm to about 10 μM, or about 1 μm to about 5 μm.

The separator 10 may be formed, for example, by coating a heat resistant composition onto one surface or both surfaces of the porous substrate 20, followed by drying and curing the same.

The heat resistant composition may include the binder, the filler, an initiator, and a solvent.

The initiator may be a photoinitiator, a thermal initiator, or a combination thereof. The photoinitiator may be used for photo-polymerization using ultraviolet rays. Examples of the photoinitiator include acetophenones such as diethoxy-acetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy)ethyl] benzenemetanamium bromide, and (4-benzoylbenzyl)trimethylammoniumchloride; thioxanthones such as 2,4-diethylthioxanthone, and 1-chloro-4-dichlorothioxanthone; 2,4,6-trimethylbenzoyldiphenylbenzoyloxide; sulfonium salts, or the like. The photoinitiators may be used singularly or as a mixture of two or more. The thermal initiator may be used for thermal polymerization. The thermal initiator may include an organic peroxide free radical initiator. Examples of the organic peroxide free radical initiator include diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethylcyclohexane, and t-butyihydroperoxide. These may be used singularly or as a mixture of two or more.

The solvent may be a suitable solvent to dissolve or disperse the binder, the filler, and the initiator. For example, the solvent may be an alcohol such as methanol, ethanol, or isopropylalcohol, dimethyl formamide, dimethyl acetamide, tetramethylurea, triethylphosphate, N-methyl-2-pyrrolidone, dimethylsulfoxide, acetone, methylethylketone, methylisobutylketone, cyclohexanone, or a combination thereof.

The coating may be performed, for example, by spin coating, dip coating, bar coating, die coating, slit coating, roll coating, inkjet printing, or the like.

The drying may be performed, for example, by drying with warm air, hot air, or low humid air, vacuum-drying, or radiation of a far-infrared ray, an electron beam, or the like. For example, the drying may be performed at about 25° C. to about 120° C., or, for example, at about 80° C. to about 100° C. for about 5 seconds to about 60 seconds, in a batch or continuous method.

The curing may be performed by photocuring, thermal curing, or a combination thereof. The photocuring may be performed, for example, by radiating UV of about 150 nm to about 170 nm for about 5 seconds to about 300 seconds. The thermal curing may be performed, for example, at about 60° C. to about 120° C. for about 1 hour to about 36 hours, or, for example, at about 80° C. to about 100° C. for about 10 hours to about 24 hours. In some implementations, the separator for a rechargeable battery may be formed using a method of lamination, coextrusion, or the like.

Hereinafter, a rechargeable lithium battery including the separator for a rechargeable battery is described.

A rechargeable lithium battery may be classified into a lithium ion battery, a lithium ion polymer battery, and a lithium polymer battery depending on kind of separator and electrolyte. A rechargeable lithium battery may also be classified as a cylindrical, prismatic, coin-type, pouch-type, or the like, depending on its shape. In addition, the rechargeable lithium battery may be a bulk type and a thin film type depending on its size.

Herein, a prismatic rechargeable lithium battery as an example of a rechargeable lithium battery is explained.

FIG. 4 is an exploded perspective view of a rechargeable lithium battery according to an embodiment.

Referring to FIG. 4, a rechargeable lithium battery 100 according to an embodiment may include a wound electrode assembly 60 including a separator 10 interposed between a positive electrode 40 and a negative electrode 50, and a case 70 housing the electrode assembly 60.

The electrode assembly 60 may be formed by interposing a separator 10 between the positive electrode 40 and the negative electrode 50 and then winding the positive electrode 40, separator 10, and negative electrode 50 into a jelly-roll shape.

The positive electrode 40, the negative electrode 50, and the separator 10 are impregnated in an electrolyte solution. The case 70 may be sealed.

The positive electrode 40 may include a positive current collector and a positive active material layer formed on the positive current collector. The positive active material layer may include a positive active material, a binder, and optionally a conductive material.

The positive current collector may include aluminum (Al), nickel (Ni), or the like, as examples.

The positive active material may include a compound being capable of intercalating and deintercalating lithium. For example, at least one of a composite oxide or a composite phosphate of a metal selected from cobalt, manganese, nickel, aluminum, iron, or a combination thereof and lithium may be used. The positive active material may include, for example, lithium cobalt oxide, lithium nickel oxide, lithium manganese oxide, lithium nickel cobalt manganese oxide, lithium nickel cobalt aluminum oxide, lithium iron phosphate, or a combination thereof.

The binder may improve binding properties of positive active material particles with one another and with a current collector. Examples of a binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. These may be used singularly or as a mixture of two or more.

The conductive material may improve the conductivity of an electrode. Examples of the conductive material may include natural graphite, artificial graphite, carbon black, a carbon fiber, a metal powder, a metal fiber, or the like. These may be used singularly or as a mixture of two or more. The metal powder and the metal fiber include use a metal of copper, nickel, aluminum, silver, or the like.

The negative electrode 50 may include a negative current collector and a negative active material layer formed on the negative current collector.

The negative current collector may include copper (Cu), gold (Au), nickel (Ni), a copper alloy, or the like, as examples.

The negative active material layer may include a negative active material, a binder, and optionally, a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material, for example, a generally-used carbon-based negative active material. Examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon (low temperature fired carbon) or hard carbon, a mesophase pitch carbonized product, fired coke, or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si-Q alloy, Sn, $SnO_2$, a Sn—C composite, a Sn-Q, or the like. At least one of these may be mixed with $SiO_2$. Examples of the element Q may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof. When the material capable of doping and dedoping lithium is Si-Q, Q is not Si. When the material capable of doping and dedoping lithium is Sn-Q, Q is not Sn. The transition metal oxide may be vanadium oxide, lithium vanadium oxide, or the like.

The binder and the conductive material used in the negative electrode may be the same as the binder and conductive material of the positive electrode.

The positive electrode 40 and the negative electrode 50 may be manufactured by mixing each active material composition including a corresponding active material and a binder, and optionally a conductive material in a solvent, and coating the active material composition onto a respective current collector. The solvent may be N-methylpyrrolidone, or the like.

The separator 10 may be the same as described above.

The electrolyte solution may include an organic solvent and a lithium salt.

The organic solvent may serve as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent.

The carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may be dibutyl ether, tetraglyme, diglyme, dimethoxyethane, 2-methyltetrahydrofuran, tetrahydrofuran, or the like. The ketone-based solvent may be cyclohexanone, or the like. The alcohol-based solvent may be ethanol, isopropyl alcohol, or the like. The aprotic solvent may be a nitrile such as R—CN (R is a C2 to C20 linear or branched or cyclic hydrocarbon group, a double bond, an aromatic ring, or an ether bond), or the like, an amide such as dimethyl formamide, a dioxolane such as 1,3-dioxolane, a sulfolane, or the like.

The organic solvent may be used alone or in a mixture. When the organic solvent is used in a mixture, the mixture ratio can be controlled in accordance with a desirable battery performance.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers), LiCl, LiI, $LiB(C2O4)2$, or a combination thereof.

The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery including the separator may be operated at a high voltage of greater than or equal to about 4.2 V. Thus, a rechargeable lithium battery having a high capacity may be provided without the deterioration of cycle life characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Separator

Preparation Example 1

1.1 wt % of an acryl binder (SC2152, Miwon Specialty Chemical Co., Ltd.), 0.8 wt % of polyvinylidene fluoride (PVdF) (KF9300, Kureha), 0.1 wt % of benzoyl peroxide (Daejung Chemicals & Metals), 12.1 wt % of α-$Al_2O_3$ (AES11, Sumitomo) having a diameter of 500 nm, 3.0 wt % of talc (KC3000, manufactured by KOCH) having aspect ratio of 2 to 5, and 82.9 wt % of acetone were mixed to prepare a composition.

The composition was DM (Direct Metering) coated onto a polyethylene substrate (SK innovation Co.) having a thickness of 12 μm and then cured at 100° C. for 24 hours to provide a separator formed with a heat-resistant layer having a thickness of 3.3 μm.

Preparation Example 2

A separator was manufactured in accordance with the same procedure as in Preparation Example 1, except that 3.0 wt % of mica (manufactured by KOCH) having aspect ratio of 2 to 8 was used instead of 3.0 wt % of talc.

Preparation Example 3

A separator was manufactured in accordance with the same procedure as in Preparation Example 1, except that 13.6 wt % of α-$Al_2O_3$ and 1.5 wt % of talc were used instead of 12.1 wt % of α-$Al_2O_3$ and 3.0 wt % of talc.

Preparation Example 4

A separator was manufactured in accordance with the same procedure as in Preparation Example 1, except that 8.96 wt % of α-$Al_2O_3$ and 6.04 wt % of talc were used instead of 12.1 wt % of α-$Al_2O_3$ and 3.0 wt % of talc.

Comparative Preparation Example 1

A separator was manufactured in accordance with the same procedure as in Preparation Example 1, except that 15.1 wt % of α-$Al_2O_3$ was used instead of 12.1 wt % of α-$Al_2O_3$, and talc was not included.

Comparative Preparation Example 2

A separator was manufactured in accordance with the same procedure as in Preparation Example 1, except that 7.55 wt % of α-$Al_2O_3$ and 7.55 wt % of talc were used instead of 12.1 wt % of α-$Al_2O_3$ and 3.0 wt % of talc.

Comparative Preparation Example 3

A separator was manufactured in accordance with the same procedure as in Preparation Example 1, except that 3.0 wt % of a sphere-shaped magnesium oxide particle (Sumitomo) having a diameter of 200 nm (D50) was used instead of 3.0 wt % of talc.

Comparative Preparation Example 4

A separator was manufactured in accordance with the same procedure as in Preparation Example 1, except that 3.0 wt % of a sphere-shaped γ-$Al_2O_3$ particle (Sumitomo) having a diameter of 60-80 nm (D50) was used instead of 3.0 wt % of talc.

Comparative Preparation Example 5

A separator was manufactured in accordance with the same procedure as in Preparation Example 1, except that an acryl binder was not included, and 1.9 wt % of polyvinylidene fluoride (PVdF) was used.

Evaluation 1

Separators according to Preparation Examples 1 to 4 and Comparative Preparation Examples 1 to 5 were evaluated for an elastic modulus of the heat-resistant layer and the separator.

The elastic modulus was measured using a UTM materials testing machine (LRX Plus, manufactured by AMETEK).

A separator was cut to a size of 10 mm×15 mm to provide a sample. The sample was held in the UTM materials testing machine for analysis in a tensile strength measuring mode. When measuring a force per a unit area with respect to an extensometer, the slope of the early linearly region refers to an elastic modulus ($E_{eff}$) of the separator. The elastic modulus ($E_f$) of the heat-resistant layer was obtained according to Calculation Equation.

$$E_{eff} = \frac{1 + m^2n^4 + 2mn(2n^2 + 3n + 2)}{(1+n)^3(1+mn)} E_s \quad \text{[Calculation Equation 1]}$$

$$m = E_f/E_s, \; n = h_f/h_s$$

In Calculation Equation 1,
Ef is an elastic modulus of the heat-resistant layer,
Es is an elastic modulus of the polyethylene substrate,
hf is a thickness of the heat-resistant layer,
hs is a thickness of the polyethylene substrate.
The results are shown in Table 1.

TABLE 1

|  | Elastic modulus of heat-resistant layer (MPa) | Elastic modulus of separator (MPa) |
|---|---|---|
| Preparation Example 1 | 4421 | 2483 |
| Preparation Example 2 | 4138 | 2200 |
| Preparation Example 3 | 4038 | 2100 |
| Preparation Example 4 | 4288 | 2350 |
| Comparative Preparation Example 1 | 3597 | 1659 |

TABLE 1-continued

| | Elastic modulus of heat-resistant layer (MPa) | Elastic modulus of separator (MPa) |
|---|---|---|
| Comparative Preparation Example 2 | 3738 | 1800 |
| Comparative Preparation Example 3 | 3768 | 1830 |
| Comparative Preparation Example 4 | 3876 | 1820 |
| Comparative Preparation Example 5 | 2138 | 200 |

Referring to Table 1, it may be seen that the separators according to Preparation Examples 1 to 4 showed a higher overall elastic modulus of the heat-resistant layer and the separator as compared to the separators according to Comparative Preparation Examples 1 to 5.

Evaluation 2

For the separators according to Preparation Examples 1 to 4 and Comparative Preparation Examples 1 to 5, the shrinkage ratios after each separator was allowed to stand in an oven at 130° C. for 1 hour and the shrinkage ratio after each separator was allowed to stand in an oven at 200° C. for 10 minutes were evaluated. The shrinkage ratio of each separator was evaluated from the length change in a MD direction (machine direction) and a TD direction (transverse direction) by comparing the lengths before and after disposing the separator in an oven.

The results are shown in Table 2.

TABLE 2

| | Thermal shrinkage ratio (%) (130° C., 1 hr) | | Thermal shrinkage ratio (%) (200° C., 10 min) | |
|---|---|---|---|---|
| | MD direction | TD direction | MD direction | TD direction |
| Preparation Example 1 | 0 | 0 | 3 | 4 |
| Preparation Example 2 | 0 | 0 | 2 | 3 |
| Preparation Example 3 | 0 | 0 | 3 | 3 |
| Preparation Example 4 | 0 | 0 | 4 | 4 |
| Comparative Preparation Example 1 | 0 | 0 | 4 | 3 |
| Comparative Preparation Example 2 | 0 | 0 | 3 | 4 |
| Comparative Preparation Example 3 | 0 | 0 | 3 | 3 |
| Comparative Preparation Example 4 | 0 | 0 | 3 | 2 |
| Comparative Preparation Example 5 | 2 | 2 | Measurement impossible | Measurement impossible |

Referring to Table 2, it may be confirmed that the separators according to Preparation Examples 1 to 4 showed almost zero thermal shrinkage ratio or less than or equal to 5% of shrinkage ratio.

Manufacture of Rechargeable Lithium Battery Cell

Example 1

$LiCoO_2$, polyvinylidene fluoride, and carbon black were added at a weight ratio of 96:2:2 into a N-methylpyrrolidone (NMP) solvent to provide a slurry. The slurry was coated onto an aluminum (Al) thin film and dried and pressed to provide a positive electrode.

Graphite, polyvinylidene fluoride, and carbon black were added at a weight ratio of 98:1:1 into a N-methylpyrrolidone (NMP) solvent to provide a slurry. The slurry was coated onto a copper foil (Cu foil) and dried and pressed to provide a negative electrode.

An electrolyte solution was prepared by adding 1.15 M of $LiPF_6$ to a mixed solvent in which ethylene carbonate (EC), ethylmethyl carbonate (EMC) and diethyl carbonate (DEC) were mixed at a volume ratio of 3:5:2.

The separator according to Preparation Example 1 was interposed between the obtained positive electrode and negative electrode to provide a jelly-roll electrode assembly. Subsequently, the electrode assembly was fixed in a case without welding a lead tap. The electrolyte solution was injected into the case, and the case was sealed to provide a rechargeable lithium battery cell.

Example 2

A rechargeable lithium battery cell was manufactured in accordance with the same procedure as in Example 1, except that a separator according to Preparation Example 2 was used instead of the separator according to Preparation Example 1.

Example 3

A rechargeable lithium battery cell was manufactured in accordance with the same procedure as in Example 1, except that a separator according to Preparation Example 3 was used instead of the separator according to Preparation Example 1.

Example 4

A rechargeable lithium battery cell was manufactured in accordance with the same procedure as in Example 1, except that a separator according to Preparation Example 4 was used instead of the separator according to Preparation Example 1.

Comparative Example 1

A rechargeable lithium battery cell was manufactured in accordance with the same procedure as in Example 1, except that a separator according to Comparative Preparation Example 1 was used instead of the separator according to Preparation Example 1.

Comparative Example 2

A rechargeable lithium battery cell was manufactured in accordance with the same procedure as in Example 1, except that a separator according to Comparative Preparation Example 2 was used instead of the separator according to Preparation Example 1.

Comparative Example 3

A rechargeable lithium battery cell was manufactured in accordance with the same procedure as in Example 1, except that a separator according to Comparative Preparation Example 3 was used instead of the separator according to Preparation Example 1.

Comparative Example 4

A rechargeable lithium battery cell was manufactured in accordance with the same procedure as in Example 1, except that a separator according to Comparative Preparation Example 4 was used instead of the separator according to Preparation Example 1.

Comparative Example 5

A rechargeable lithium battery cell was manufactured in accordance with the same procedure as in Example 1, except that a separator according to Comparative Preparation Example 5 was used instead of the separator according to Preparation Example 1.

Evaluation 3

Rechargeable lithium battery cells according to Examples 1 to 4 and Comparative Examples 1 to 5 were allowed to stand in an oven at 160° C. for 1 hour, and the electrode assembly was taken out to disassemble the positive electrode, separator, and negative electrode.

Subsequently, the separator was evaluated for a shrinkage ratio in MD and TD directions. The shrinkage ratio of separator was measured for a shrinkage degree after the heat treatment by comparing the lengths thereof before and after being disposed in an oven.

The results are shown in Table 3.

TABLE 3

| | Thermal shrinkage ratio (%) (130° C., 1 hr) | |
|---|---|---|
| | MD direction | TD direction |
| Example 1 | 0 | 4 |
| Example 2 | 0 | 4 |
| Example 3 | 0 | 3 |
| Example 4 | 0 | 4 |
| Comparative Example 1 | 20 | 23 |
| Comparative Example 2 | 18 | 22 |
| Comparative Example 3 | 21 | 24 |
| Comparative Example 4 | 17 | 21 |
| Comparative Example 5 | Measurement impossible | Measurement impossible |

Referring to Table 3, it may be seen that the rechargeable lithium battery cells according to Examples 1 to 4 showed a lower thermal shrinkage ratio than the rechargeable lithium battery cells according to Comparative Examples 1 to 5. In particular, the rechargeable lithium battery cells according to Examples 1 to 4 showed thermal shrinkage ratio of almost zero or a thermal shrinkage ratio less than or equal to 5% after being allowed to stand at 160° C. for 1 hour.

By way or summation and review, when shrinkage and expansion of a positive electrode and a negative electrode during charge and discharge cycles of a battery are repeated or when a battery is abnormally operated, exothermic heat may increase, and thus a battery temperature may be abruptly increased. In this case, a separator could abruptly contract or be destroyed and thereby, a short circuit between a positive electrode and a negative electrode could occur Embodiments provide a separator for a rechargeable battery capable of providing high temperature stability. Embodiments also provide a rechargeable battery including the separator. The separator may be prevented from a shrinkage at a high temperature, and thus, stability of the battery including the separator may be increased Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A separator for a rechargeable battery, the separator comprising
a porous substrate and a heat-resistant layer on at least one surface of the porous substrate,
wherein the heat-resistant layer includes a binder having a cross-linked structure, a sphere-shaped filler, and a plate-shaped filler, and
the plate-shaped filler is included in an amount of greater than or equal to about 10 wt % and less than about 50 wt % based on a total weight of the sphere-shaped filler and the plate-shaped filler.

2. The separator as claimed in claim 1, wherein the plate-shaped filler has an aspect ratio of about 2 to about 10.

3. The separator as claimed in claim 1, wherein the plate-shaped filler has an aspect ratio of about 2 to about 5.

4. The separator as claimed in claim 1, wherein the plate-shaped filler includes a plate-shaped mineral.

5. The separator as claimed in claim 1, wherein the plate-shaped filler includes a plate-shaped oxide, a plate-shaped nitride, or a combination thereof.

6. The separator as claimed in claim 1, wherein the plate-shaped filler includes talc, mica, clay, or a combination thereof.

7. The separator as claimed in claim 1, wherein the sphere-shaped filler includes alumina.

8. The separator as claimed in claim 1, wherein the binder having a cross-linked structure is obtained by curing a monomer, an oligomer, or a polymer having at least 2 curable functional groups.

9. The separator as claimed in claim 8, wherein the curable functional group includes a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof.

10. The separator as claimed in claim 1, wherein an elastic modulus of the heat-resistant layer is greater than or equal to about 3,900 MPa.

11. The separator as claimed in claim 1, wherein an elastic modulus of the separator is greater than or equal to about 2,000 MPa.

12. The separator as claimed in claim 1, wherein the porous substrate includes a polyolefin.

13. The separator as claimed in claim 1, wherein the porous substrate includes a single layer or two or more layers.

14. A rechargeable lithium battery, comprising
a positive electrode,
a negative electrode, and
the separator as claimed in claim 1 between the positive electrode and the negative electrode.

* * * * *